Sept. 6, 1927.  W. VAN E. THOMPSON  1,641,559

HOSE BAND

Original Filed June 4, 1923

INVENTOR.

BY Walter Van E. Thompson

ATTORNEY.

Patented Sept. 6, 1927.

1,641,559

UNITED STATES PATENT OFFICE.

WALTER VAN E. THOMPSON, OF LOS ANGELES, CALIFORNIA.

HOSE BAND.

Application filed June 4, 1923, Serial No. 643,342. Renewed April 25, 1927.

My invention relates to a band designed for securing metal coupling members in the ends of flexible hose or a piece of flexible hose upon a metal pipe, and the object thereof, is to provide a cheap and efficient device for that purpose.

Referring to the drawings:—

Figure 1:
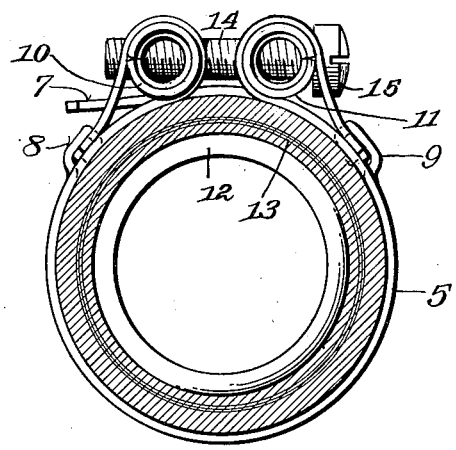
Fig. 1 is an end view of the parts shown in Fig. 2, which is a top plan view of the fragment of metal pipe secured to fragment of flexible hose by one of my improved hose bands.
Figure 2:
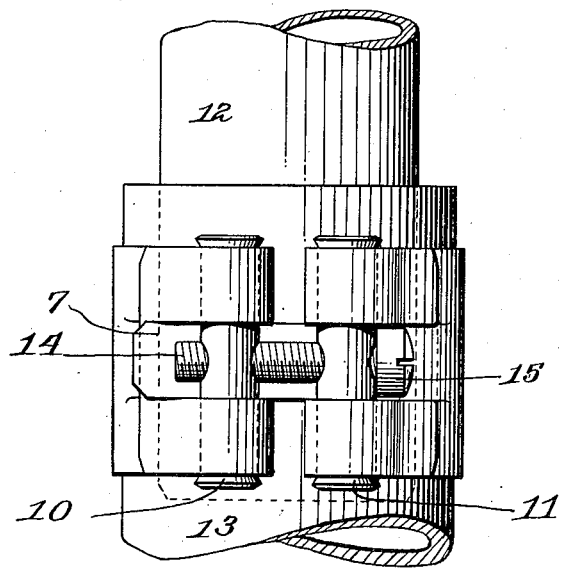
Figure 3:
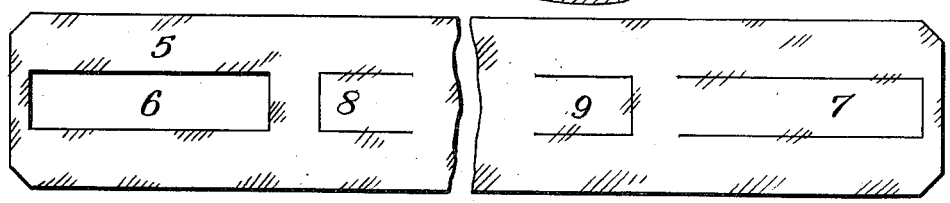
Fig. 3 is a plan of the sheet metal portion of the band, ready for use, a part of the band being broken out.

Numeral 5 is a strip of sheet metal of the desired length and weight for the use to which the band is to be put. In one end of strip, 5, an aperture, 6, is cut, and in the other end, a strip of equal length and width to that cut from the strip when forming aperture, 6, is severed at one end and along both sides and forms when assembled and positioned, what I term, pressure tongue, 7. Adjacent to aperture, 6, and to the inner end of tongue, 7, strips of the same width and shorter than tongue, 7, are severed at one end and along both sides and form, when assembled, what I term, connecting tongues, 8, and 9. I form band tubes, 10, and 11, from heavy sheet steel which are rolled into circular form and are centrally pierced and the ends swaged outwardly, as best shown in Fig. 2. The ends of strip, 5, are passed around these tubes and secured thereon. By having tongues, 8, and 9, raised to permit the ends of strip, 5, to be passed thereunder and the tongues then bent down and across and under the end of portions left after aperture, 6, and tongue, 7, are formed. The end of a metal pipe, 12, is passed into the end of a flexible hose, 13, and the band with the tubes therein, is bent around the ends of 12, and 13, and an externally, screw-threaded-bolt, 14, is passed through tube, 11, and screwed into bar, 10, until the head, 15, engages tube, 11, and draws the band tightly upon 13, thereby securing it firmly upon 12. It will be understood that the hole through, 11, snugly fits bolt, 14, and the hole through, 10, is threaded and bolt 14 is screwed therethrough as the band is put on. By making tubes 10, and 11, of rolled sheet metal, the tension put upon them by the rotation of bolt, 14, as the ends of the band are drawn together upon 12, and 13, causes them to act as a nut lock on bolt, 14, as well as connecting members.

By this construction, it will be seen that I have provided a cheap and efficient hose band for connecting a metal pipe to a flexible hose, and that when positioned, the parts are locked against accidental separation. By shortening tube, 10, it could be used as a nut upon bolts and would act as a holding and locknut at the same time. It will be observed that when band 5 is securely positioned on the hose and pipe, that 11 puts a spring tension on 14, thereby acting as a nut lock.

Having described my invention, I claim:

1. A hose clamp, comprising a strip of sheet metal having perforations in the ends thereof, and a pressure tongue at one end, formed from the metal when producing the aperture and locking tongues near the apertures, pierced tubes adapted to be held positioned by having the apertured ends bent around such bars and clamped to the other part by the locking tongues, and an externally screw-threaded-bolt, having a head, said bolt being adapted to pass through one tube and screw into the other tube.

2. In a hose clamp a body member formed from sheet metal and having apertured ends, and a pressure tongue at one end and locking tongues near the aperture in combination with tubes rolled from sheet metal, adapted to be retained by said body member, said tubes being pierced transversely and one of the holes threaded; and a threaded bolt passing through said tubes in threaded engagement with one of said tubes.

3. In a hose clamp, tubes formed of sheet metal rolled and transversely pierced, one of said transverse holes being threaded, pierced bands in which said tubes are mounted; and a threaded bolt passed through the apertures in said tubes in threaded engagement with one of said tubes.

WALTER VAN E. THOMPSON.